United States Patent [19]
Takasugi

[11] Patent Number: 6,058,714
[45] Date of Patent: May 9, 2000

[54] COMPACT RAPID CHILLING SYSTEM AND METHOD FOR RESERVING COLD

[75] Inventor: Mitsuo Takasugi, Kanagawa, Japan

[73] Assignee: Cool Pack System Corp., Tokyo, Japan

[21] Appl. No.: 09/097,589

[22] Filed: Jun. 16, 1998

[51] Int. Cl.[7] .................. F17C 7/02; F25D 3/12; F25J 1/00
[52] U.S. Cl. .................. 62/50.1; 62/384; 62/604
[58] Field of Search .................. 62/50.1, 50.2, 62/51.1, 53.2, 384, 602, 604, 603, 388

[56] References Cited

U.S. PATENT DOCUMENTS

| | | | |
|---|---|---|---|
| 3,714,793 | 2/1973 | Eigenbrod | 62/62 |
| 3,727,651 | 4/1973 | Biever | 62/50.2 |
| 5,148,679 | 9/1992 | Eve | 62/602 |
| 5,511,379 | 4/1996 | Gibot et al. | 62/602 |
| 5,657,642 | 8/1997 | Reznikov et al. | 62/384 |

FOREIGN PATENT DOCUMENTS 358172215  10/1983  Japan ...................................... 62/604

*Primary Examiner*—William Doerrler
*Attorney, Agent, or Firm*—Browdy and Neimark

[57] ABSTRACT

A compact rapid chilling system comprises: a liquefied-gas cylinder (1) filled with a liquefied gas; a cylinder holder (2) for holding the liquefied-gas cylinder (1); and, a control box (3) mounted on the cylinder holder (2). The control box (3) is provided with a nozzle (23) for issuing a jet of the liquefied gas through an electromagnetic valve, which liquefied gas is supplied from the liquefied-gas cylinder (1). The control box (3) is further provided with a control switch (25) for controlling the jet of the liquefied gas.

12 Claims, 16 Drawing Sheets

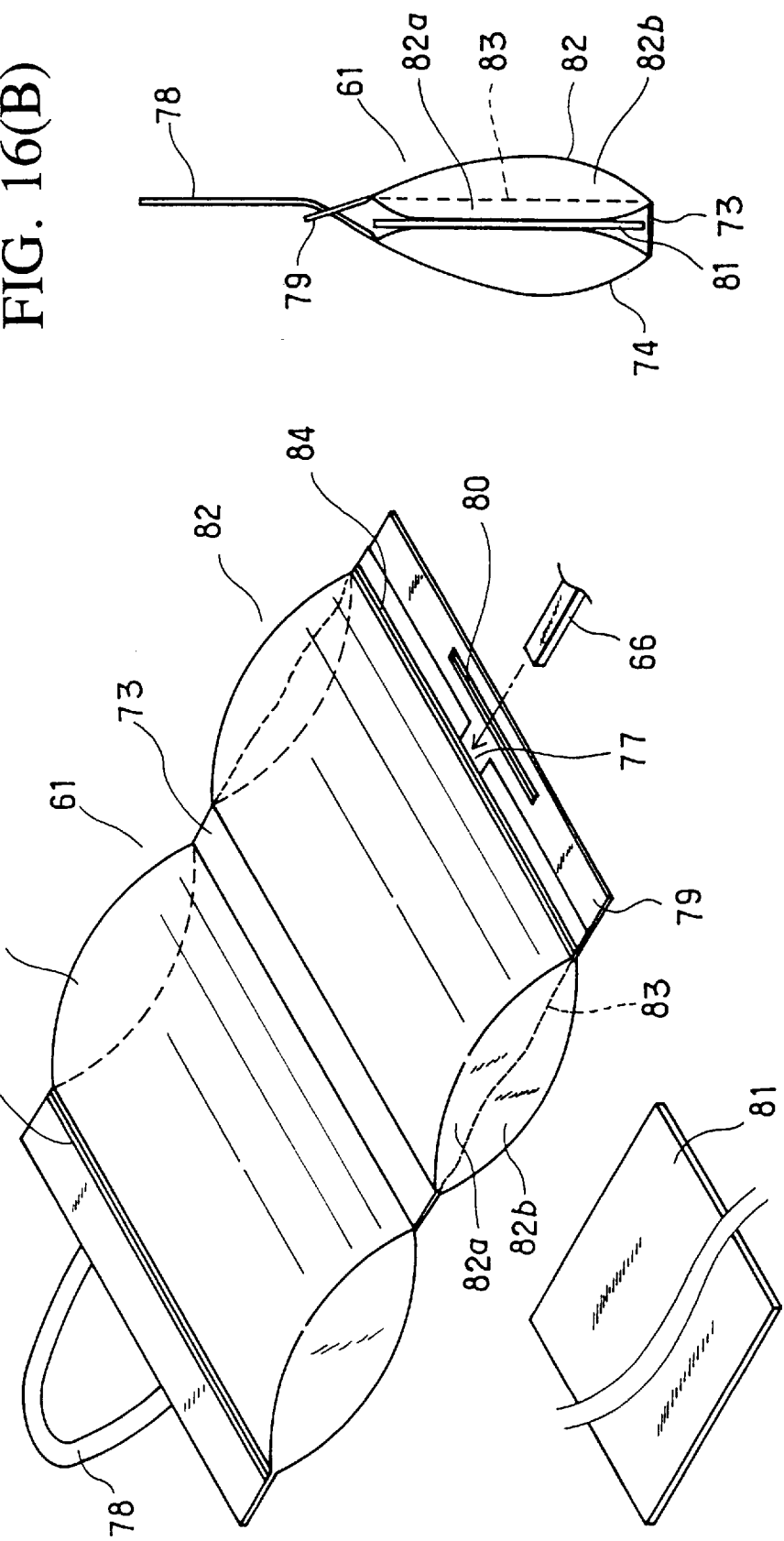
FIG. 16(A)
FIG. 16(B)

COMPACT RAPID CHILLING SYSTEM AND METHOD FOR RESERVING COLD

BACKGROUND OF THE INVENTION

1. Field of the Invention

The present invention relates to a compact rapid chilling system and a method for reserving cold, and more particularly to a compact rapid chilling system and a method for reserving cold, in which a liquefied cooling gas is used to realize an efficient transportation and delivery of goods under temperature control of the goods, for example such as: perishable foods such as vegetables, fruits, fishes and shellfishes; ice creams; natural flowers; medical and pharmaceutical products; and, like goods being reserved at low temperatures.

Further, the present invention relates to a bag and a method both for reserving chilled goods, and more particularly to such bag and such method, both of which make easier for a mere consumer to keep at low temperatures the chilled goods such as frozen goods, perishable foods, ice creams and like goods purchased from department stores, supermarkets and like stores, when he takes the goods home.

2. Description of the Related Art

In the short distance transportation of the chilled goods such as fruits, vegetables, dairy products, ice creams, fresh fishes, and like goods being reserved at low temperatures, a cold reserving vehicle (i.e., covered truck or van) with a cargo chamber made of aluminum is mainly used. In such vehicle, the inner surfaces of the cargo chamber are covered with heat insulating walls, so that the interior of the cargo chamber is cooled by means of dry ice or ice of frozen water. On the other hand, in transportation to great distances, or in transportion of frozen fishes, frozen meat and like frozen goods, it is necessary to keep the interior of the cargo chamber at predetermined temperatures. Consequently, in the cold reserving vehicle, a refrigerating unit is mounted on the roof of its driver's cab, or in the front upper portion of its cargo chamber. Such refrigerating unit is driven by either the vehicle's own motor or another motor independent thereof.

The vehicle having its cargo chamber cooled by means of dry ice or ice of frozen water is poor in cooling capacity, while being hard to control the temperature of its cargo chamber. In this type of vehicle, since it is hard to keep the temperature of its cargo chamber within a desired range of temperatures, the vehicle is considerably limited in the extent of its goods being transported and also in the extent of distances to which the goods are tansported.

On the other hand, the vehicle provided with a mechanical refrigerating unit suffers from a considerable weight of such refrigerating unit, a considerable space required for such refrigerating unit, and its running costs. Further, when the door of the cargo chamber is frequently opened and closed in loading and unloading the goods, it is very hard to control the temperature of the cargo chamber.

As described above, in the conventional types of transportion and delivery of the chilled goods to be reserved at low temperatures, there are so many problems which, generally speaking, make the transportation efficiency poor.

SUMMARY OF THE INVENTION

Consequently, it is an object of the present invention to provide a compact rapid chilling system and a method for reserving cold, in which the system is easy in operation, free from any problems as to its weight and its installation space, capable of controlling the temperature of the cargo chamber as required, and capable of economically and very efficiently transporting and delivering the chilled goods being reserved at low temperatures.

In taking the chilled goods such as ice creams home, only dry ice is attached to the ice creams. Consequently, it is necessary to purchase this type of chilled goods in the end of shopping and get home without making any side trip. In this case, as for perishable foods such as sashimi (i.e., very fresh fish eaten raw) and the like, it is inevitable for such perishable foods to be subjected to room temperatures for a short period of time, and, therefore inevitable for the thus warmed foods to lose their freshness, particularly in warm and hot seasons.

Consequently, it is another object of the present invention to provide a cold reserving method and a cold reserving bag, which are capable of keeping the purchased chilled goods such as frozen goods and the like at low temperatures for several hours.

According to a first aspect of the present invention, the above objects of the present invention are accomplished by providing:

A compact rapid chilling system comprising:
    a liquefied-gas cylinder filled with a liquefied gas;
    a cylinder holder for holding the liquefied-gas cylinder; and
    a control box mounted on the cylinder holder, the control box being provided with a nozzle for issuing a jet of the liquefied gas through an electromagnetic valve, the liquefied gas being supplied from the liquefied-gas cylinder, the control box being further provided with a control switch for controlling the jet.

Further, the above objects of the present invention are accomplished by providing:

A cold reserving method comprising the steps of:
    providing a liquefied-gas supply space in an upper portion of a cold-reserving container;
    supplying a liquefied gas into the upper portion of the cold-reserving container to produce carbon dioxide snow therein; and
    compressing the carbon dioxide snow.

In addition, the above objects of the present invention are accomplished by providing:

A cold reserving method for reserving chilled goods at low temperatures, comprising the steps of:
    supplying a liquefied gas into a container containing the goods, which a mere consumer purchased, so that carbon dioxide snow is produced in the container, whereby the interior of the container is cooled.

Further, the above objects of the present invention are accomplished by providing:

A cold reserving bag comprising:
    a liquefied-gas supply space into which a liquefied gas is supplied; and
    a chilled-goods storage space, which is constructed of the liquefied-gas supply space or of another space adjacent to the liquefied-gas supply space.

BRIEF DESCRIPTION OF THE DRAWINGS

FIGS. 16(A) and 16(B) are a perspective and a side view of a fifth embodiment of the cold reserving bag of the present invention, illustrating the construction and the usage thereof, respectively;

DESCRIPTION OF THE PREFERRED EMBODIMENTS

Hereinbelow, the present invention will be described in detail with reference to the accompanying drawings.

Figure 1:
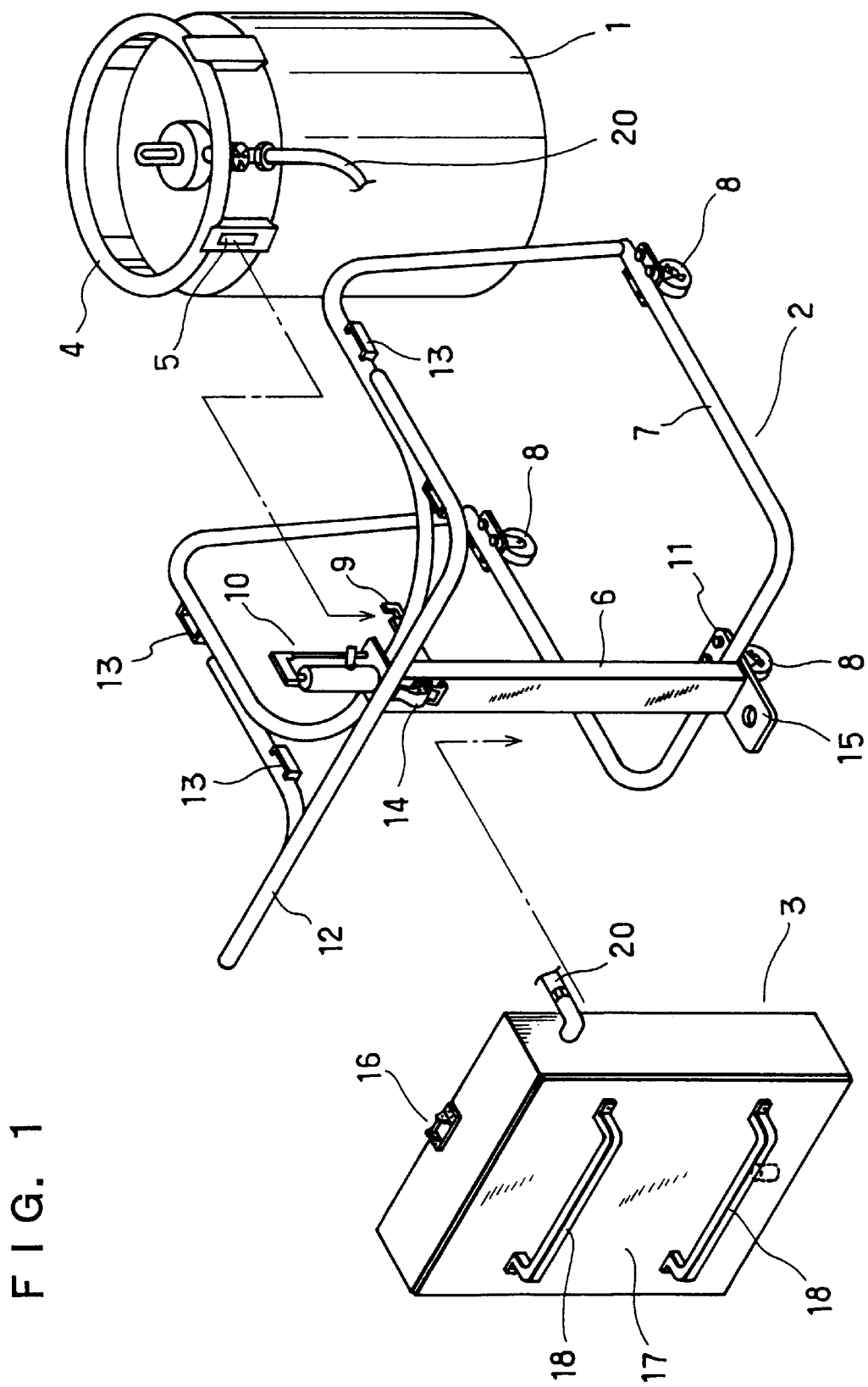
FIG. 1 is an exploded perspective view of an embodiment of the system of the present invention.
Figure 2:
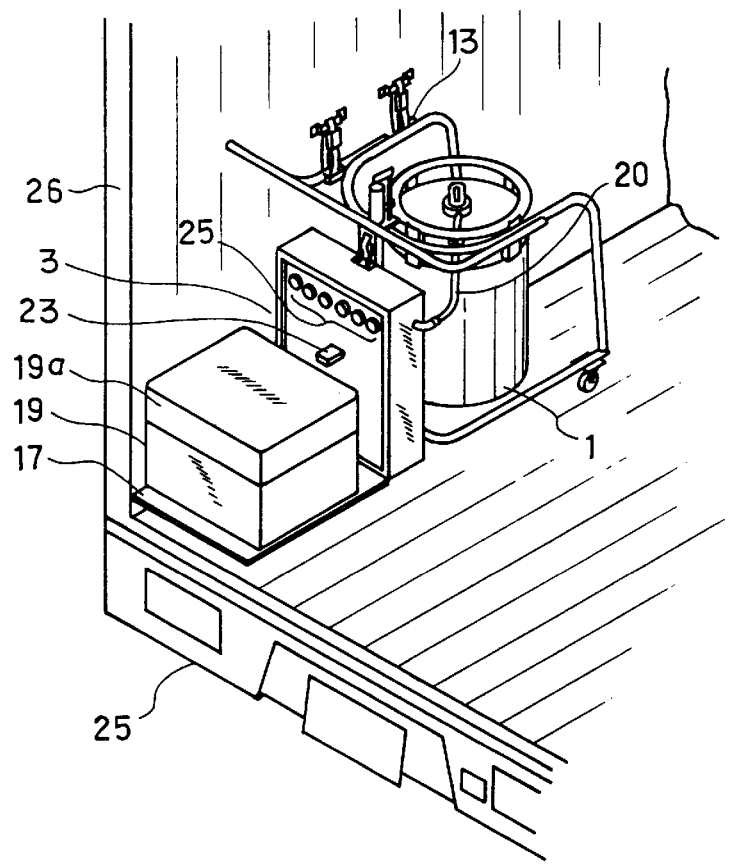
FIG. 2 is a perspective view of an installation example of the system of the present invention shown in FIG. 1.
Figure 3:
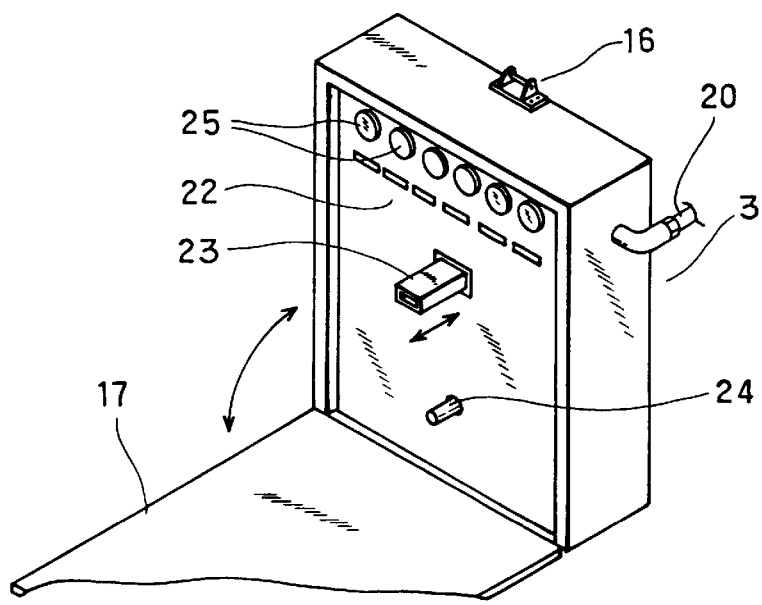
FIG. 3 is a perspective view of the control box of the system of the present invention shown in FIG. 1, illustrating the construction of the control box.

Referring now to FIG. 1, there is shown a first embodiment of a compact rapid chilling system of the present invention, in which: the reference 1 denotes a liquefied-gas cylinder filled with liquid carbon dioxide or liquid nitrogen; 2 a cylinder holder for holding the liquefied-gas cylinder 1; and, 3 a control box fixedly mounted on the cylinder holder 2, through which box 3 the liquefied gas is supplied to a cold reserving container 19 (shown in FIG. 2). The container 19 may be made of any adequate material, for example such as foamed material, paper, upholstered material and the like, and may assume a boxy shape including any folding type when the container 19 is relatively small. On the other hand, when the container 19 is medium or large in size, the container 19 may be made of plastics, and/or metals such as aluminum and the like. The liquefied-gas cylinder 1 is provided with a handle grip ring 4 in its upper surface. The handle grip ring 4 is connected with a main body of the liquefied-gas cylinder 1 through a plurality of connecting members, in one of which members is formed a catching hole 5.

On the other hand, the cylinder holder 2 is constructed of: a post 6; a pipe framework 7 connected with an upper and a lower end portions of the post 6 to hold the liquefied-gas cylinder 1 therein; and, in general, three casters 8. The post 6 is provided with a jack 10 in its upper-end portion for vertically driving a hook member 9. This hook member 9 is capable of engaging with the catching hole 5 of the liquefied-gas cylinder 1. Consequently, the cylinder 1 is held by the cylinder holder 2 in a condition in which its catching hole 5 is engaged with the hook member 9 of the holder 2. In storage, the liquefied-gas cylinder 1 is put on the floor or the ground. When moved, the liquefied-gas cylinder 1 is lifted off by means of the jack 10 of the cylinder holder 2. In this lifting off, since the liquefied-gas cylinder 1 is subjected to a single-point support provided by the hook member 9, the cylinder 1 tends to tilt. However, Such tilt of the cylinder 1 is limited by a projection 11, which is provided in a lower-end portion of the post 6 of the cylinder holder 2 to abut against an outer peripheral surface of the cylinder 1.

The pipe framework 7 is provided with a handle bar 12, which is across the post 6 from the liquefied-gas cylinder 1, and extends upward and outward. Further, the pipe framework 7 is provided with a plurality of anchoring pieces 13 in its appropriate portions, through which pieces 13 the pipe framework 7 is fixed to the wall of the cargo-carrying platform of the vehicle. In moving the system of the present invention, the system is pushed through the handle bar 12. As is clear from FIG. 2, the post 6 is provided with a control-box fixing piece 14 and a control-box carrying plate 15 in an upper-end and a lower-end portion of its outer surface, respectively. The control-box carrying plate 15 projects forward from the outer surface of the post 6.

The control box 3 is provided with an anchoring piece 16 in its upper surface. The piece 16 corresponds in position to the control-box fixing piece 14. Further, the control box 3 has one of its side surfaces be capable of opening downward so as to form a container-carrying table 17. In mounting the container 19 on the thus formed table 17, the table 17 is kept horizontal by means of at least one leg member 18 provided in a lower surface of the table 17.

The control box 3 is connected with the liquefied-gas cylinder 1 through a charging hose 20 through which the liquefied gas is introduced into the control box 3. The thus introduced liquefied gas is supplied, through an electromagnetic valve, to the nozzle 23 projecting from a panel surface 22 of the control box 3. In general, the nozzle 23 is capable of moving back and forth. For example, the nozzle 23 is always urged forward under the influence of a resilient force exerted by a spring and like means, and is projected forward when the container-carrying table 17 is opened to assume its horizontal position.

In the panel surface 22 of the control box 3, there are provided a safety switch 24 and a plurality of control switches 25. In general, the safety switch 24 is turned on and off when the container-carrying table 17 is opened and closed, respectively. Consequently, it is possible to prevent the system of the present invention from being energized in a condition in which the container-carrying table 17 is closed. On the other hand, the control switches 25 are constructed of a plurality of button switches, which are used to select a desired cooling temperature and a desired period of cooling time both required for a cold reserving operation, for example such as those of freezing, refrigerating, and cooling when the goods are subjected to short-, medium-, or great-distance transport. A power switch is also provided in the panel surface 22 of the control box 3 in the vicinity of one of these control switches 25. Consequently, in operation, the electromagnetic valve (not shown) of the system of the present invention is controlled through such control switches 25 to regulate the amount of the liquefied gas ejected from the nozzle 23.

FIG. 2 shows one of examples of the use of the system of the present invention, in which the system is placed in a corner of a load-carrying platform of a light truck. In this case, the system has its anchoring pieces 13 fixed to a side wall 26 of the load-carrying platform, onto which the liquefied-gas cylinder 1 is loaded. At this time, the control box 3 has its panel surface 22 face toward the outside of the load-carrying platform. Further, as is clear from FIG. 2, in front of the control box 3, the load-carrying platform provides an ample space for the container-carrying table 17 placed in its horizontal position.

In use, the container-carrying table 17 is pulled forward so as to assume its horizontal position. After that, the container 19 is placed onto the container-carrying table 17, and then pushed rearward so as to slide on the table 17, whereby the container 19 has a nozzle-catching portion of its boxlike lid 19a connected with the nozzle 23 of the control box 3. Then, the power switch (not shown) of the system of the present invention is turned on. Under such circumstances, the control switches 25 are operated to select a desired operation, for example such as those of freezing, refrigerating and the like in short-, medium-, or great-distance transport of the goods, so that a predetermined amount of the liquefied gas is injected into the container 19 through the nozzle 23.

Figure 4:
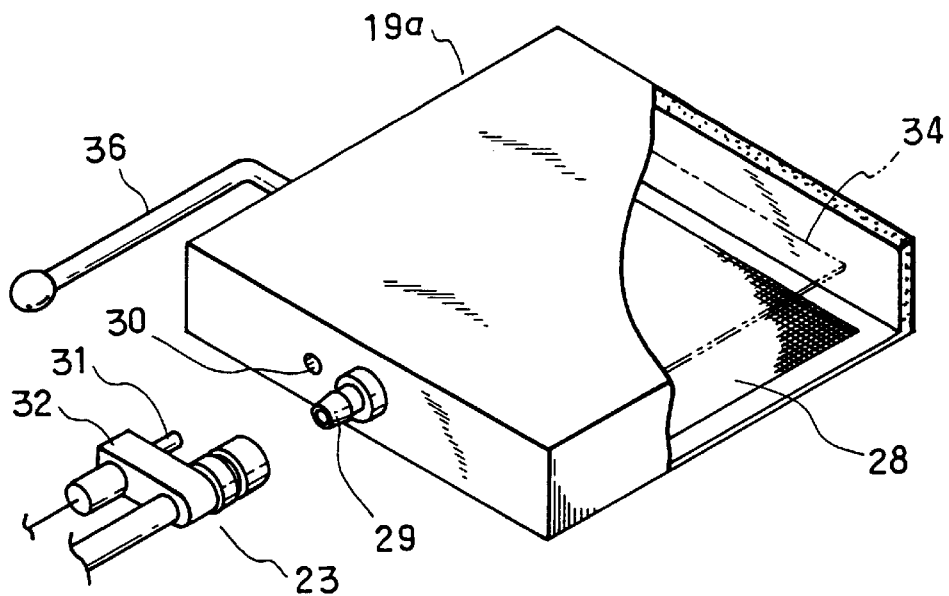
FIG. 4 is a perspective view of a lid portion of a compact cold reserving container used in the system of the present invention shown in FIG. 1, illustrating the construction of the lid portion.
Figure 5:
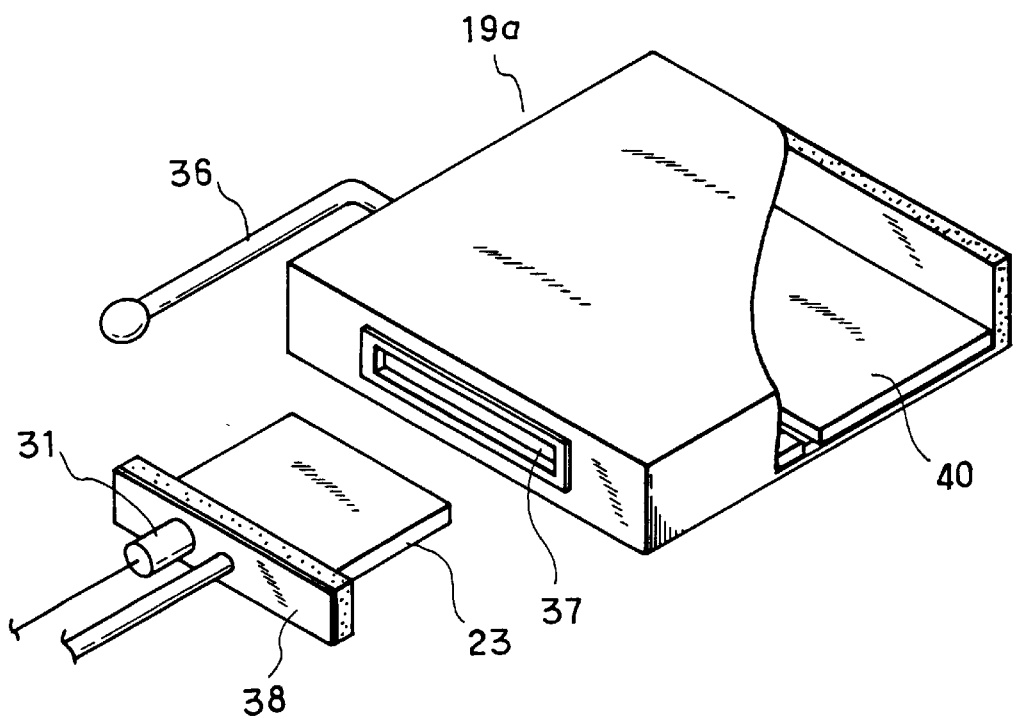
FIG. 5 is a perspective view of another type of the lid portion of the compact cold reserving container used in the system of the present invention shown in FIG. 1, illustrating the construction of the lid portion.
Figure 6:
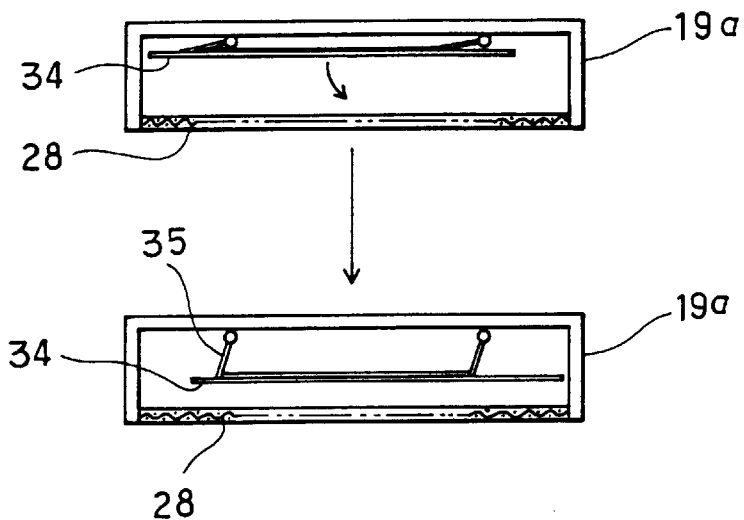
FIG. 6 are side views of the lid portion of the compact cold reserving container used in the system of the present invention shown in FIG. 1, illustrating the compression means of the lid portion in operation.

FIGS. 4 to 6 show examples of the boxlike lid 19a of the container 19 in construction when liquid carbon dioxide is used as the liquefied gas. The boxlike lid 19a shown in FIG. 4 has its outer surfaces constructed of heat-insulating material with the exception of its bottom surface. Provided in this bottom surface is a snow receiver 28, which is made of any proper material, for example such as filter materials, a gas-permeable material such as meshes and the like, or constructed of a metal plate and like members. In the boxlike lid 19a shown in FIG. 4, the nozzle-catching portion described above is constructed of a connector 29, which is provided in one of side surfaces of the boxlike lid 19a. Also provided in such one of the side surfaces of the boxlike lid 19a is a pressure-sensor receiving hole 30. Through this hole 30, a pressure sensor 31, which is mounted on a support member 32 fixed to the nozzle 23, is inserted into the boxlike lid 19a.

Further provided in the boxlike lid 19a is a compression means such as a compression plate 34 for compressing carbon dioxide snow, which is produced by supplying the liquefied gas into the boxlike lid 19a. The carbon dioxide snow thus compressed forms a snow block. Although the compression plate 34 shown in FIGS. 4 and 6 compresses the carbon dioxide snow from above in a vertical direction, it is also possible for the compression means to compress the carbon dioxide snow in a horizontal direction. As is clear from FIG. 6, the compression plate 34 is mounted on a ceiling wall of the boxlike lid 19a through a pair of swinging arms 35. Connected with one of these swinging arms 35 is a handle 36, which projects from the boxlike lid 19a outward, as shown in FIG. 4. In snow-compression operation, when the operator rotates the handle 36, the swinging arms 35 are swung downward from their horizontal positions to move the compression plate 34 downward, so that the carbon dioxide snow produced on the snow receiver 28 is compressed into the snow block (see FIG. 6).

As for the nozzle 23, one shown in FIG. 4 is adapted to engage with the the nozzle-catching portion or connector 29 of the boxlike lid 19a. On the other, the nozzle 23 shown in FIG. 5 assumes a flat shape, and is therefore adapted to engage with the nozzle-catching portion or elongated hole 37 of the boxlike lid 19a. In this case, such elongated hole 37 is ample in size for the nozzle 23 so as to permit the pressure sensor 31 to enter the elongated hole 37 together with the nozzle 23. As is clear from FIG. 5, the nozzle 23 and the pressure sensor 31 are fixedly mounted in a flat packing member 38.

In the example shown in FIG. 5, a cold reserving member 40 is mounted on an inner bottom surface of the boxlike lid 19a. The cold reserving member 40 enhances time-delayed cooling effects when a so-called soft-block dry ice (described later) is used in the boxlike lid 19a. The place, in which the cold reserving member 40 is mounted, is not limited to the bottom surface of the boxlike lid 19a. In other words, the cold reserving member 40 may be mounted on any other portion of the boxlike lid 19a, for example such as its side surfaces or ceiling surface. It is not necessarily required to mount the cold reserving member 40 on the entire surface of the boxlike lid 19a.

In use, for example, as shown in FIG. 2, the compact rapid chilling system of the present invention having the above construction is mounted on the load-carrying platform of the light truck. Under such circumstances, the container-carrying table 17 is pulled forward so as to assume its horizontal position. After that, the container 19 is placed onto the container-carrying table 17, and then pushed rearward so as to slide on the table 17, whereby the container 19 has: the connector 29 of its boxlike lid 19a connected with the nozzle 23 of the control box 3, as shown in FIG. 4; or, the elongated hole 37 of its boxlike lid 19a receive the nozzle 23 of the control box 3 therein, as shown in FIG. 5. Then, the power switch (not shown) of the system of the present invention is turned on. Under such circumstances, the control switches 25 are operated so that a predetermined amount of liquid carbon dioxide is injected into the boxlike lid 19a. In this control of the amount of liquid carbon dioxide, for example, a pressure inside the boxlike lid 19a is measured by means of the pressure sensor 31. When the thus measured pressure reaches a preset value, the electromagnetic valve (not shown) of the system of the present invention is closed.

In general, liquid carbon dioxide is filled in the liquefied-gas cylinder 1 at a pressure of 20 KgF/cm2 G, provided that the cylinder 1 is heat-insulated by means of vaccum. When the liquid carbon dioxide is ejected from the liquefied-gas cylinder 1 at room temperature, such ejection immediately increases the volume of carbon dioxide by a factor of 280. Of the carbon dioxide thus increased in volume, an approximately 47 percent by volume thereof forms carbon dioxide snow (i.e., snow dry ice), and the remaining approximately 53 percent by volume thereof forms carbon dioxide gas. Since the carbon dioxide snow is very large in surface area and brought into contact with air through such large surface area, its evaporation is enhanced. The thus enhanced evaporation of the carbon dioxide snow is capable of rapidly chilling the goods but unable to keep alive the carbon dioxide snow itself for a long period of time.

Consequently, in the present invention, in order to increase an available period of cold reserving time, the carbon dioxide snow is compressed into a block, so that the total surface area of the carbon dioxide snow is decreased, whereby the evaporation rate of the carbon dioxide snow is also decreased. Incidentally, the above-mentioned block is not solid, but relatively soft so as to be formed as a soft snow block. In this case, the degree of compaction in such soft snow block is controlled so as to adjust in length the available period of cold reserving time for the goods contained in the container 19.

In the embodiment of the system of the present invention having the above construction, since the degree of compaction of the soft snow block depends on an angle of rotation of the handle 36, preferably, an appropriate scale for indicating the angle of rotation of the handle 36 is provided in a desired side surface of the container 19 or of its boxlike lid 19a.

Figure 9:
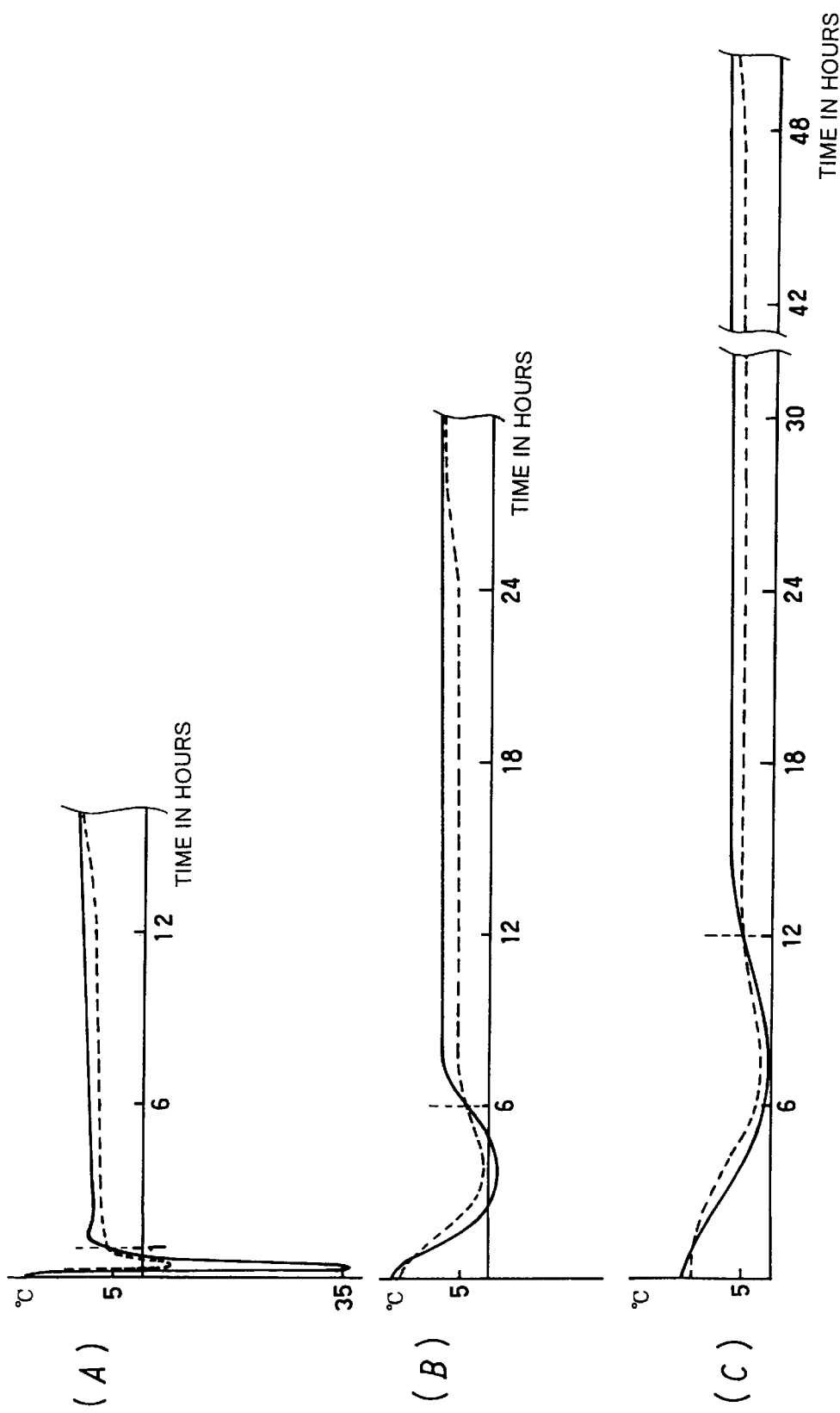
FIGS. 9(A), 9(B) and 9(C) are graphs illustrating a high degree of effectiveness of the method of the present invention.

FIGS. 9(A), 9(B) and 9(C) are graphs, in which: temperatures in the interior of the container 19 are shown in solid lines; and, temperatures in the surfaces of the goods are shown in dotted lines. More specifically, FIG. 9(A) is a graph showing temperature variations in a condition in which the carbon dioxide snow itself (not compressed) is used. FIG. 9(B) is a graph showing temperature variations in a condition in which the soft snow block is used without using the cold reserving member 40.

FIG. 9(C) is a graph showing temperature variations in a condition in which both the soft snow block and the cold reserving member 40 are used.

In the graph shown in FIG. 9(A), the interior of the container 19 is cooled to a temperature of less than or equal to −35 degrees centigrade within several tens of minutes of ejection of carbon dioxide gas, so that the surface temperatures of the goods are also rapidly decreased in accordance with the temperature of the interior of the container 19. After that, the temperature of the interior of the container 19 increases rapidly. After a lapse of approximately one hour from such ejection, they (i.e., the surface temperatures of the goods and the temperature of the interior of the container 19) are coincident with each other at a certain temperature (hereinafter referred to as the saturation temperature). After that, they slightly and gradually increase. Under such circumstances, any large variations in temperature do not appear in the graph of FIG. 9(A) until approximately twelve hours elapse. Consequently, the method described above is useful in a short-distance transport of the goods, provided that such short-distance transport is completed within a brief period of twelve hours. Consequently, the above method is not available in a medium- and a long-distance transport both requiring a period of time more than twelve hours to complete.

In the graph shown in FIG. 9(B), since the soft snow block is used in this case, the evaporation rate of the soft snow block is slowed down. Consequently, any rapid decrease in temperature of the interior of the container 19 as is in the graph of FIG. 9(A) is not observed here. As is clear from FIG. 9(B), the temperature in the interior of the container 19 ralatively slowly decreases, and reaches its lowest value after a lapse of from approximately three to approximately four hours. After that, the temperature in the interior of the container 19 slowly increases, and reaches its equilibrium state after a lapse of approximately eight hours. On the other hand, as for the surface temperatures of the goods, these surface temperatures vary substantially in the same manner as that of the interior of the container 19, and reaches its saturation temperature after a lapse of approximately six hours. After that, the surface temperatures of the goods reach an equilibrium state at a temperature lower than that of the interior of the container 19, and keep this equilibrium state. Consequently, a transportation period of time available in case of FIG. 9(B) is two times as long as that available in case of FIG. 9(A).

In the graph shown in FIG. 9(C), the cold reserving member 40 is first cooled by the soft snow block, and then the interior of the container 19,is cooled through this cold reserving member 40. Consequently, the cooling effects are retarded in this case. More specifically, both the temperature in the interior of the container 19 and the surface temperatures of the goods reach their lowest values after a lapse of approximately eight hours, and reach their saturation temperatures after a lapse of approximately twelve hours, as is clear from FIG. 9(C). After that, these temperatures show substantially no variation until 48 hours elapse from the ejection of carbon dioxide gas. Consequently, a transportation period of time available in case of FIG. 9(C) is two times as long as that available in case of FIG. 9(B).

Figure 7:
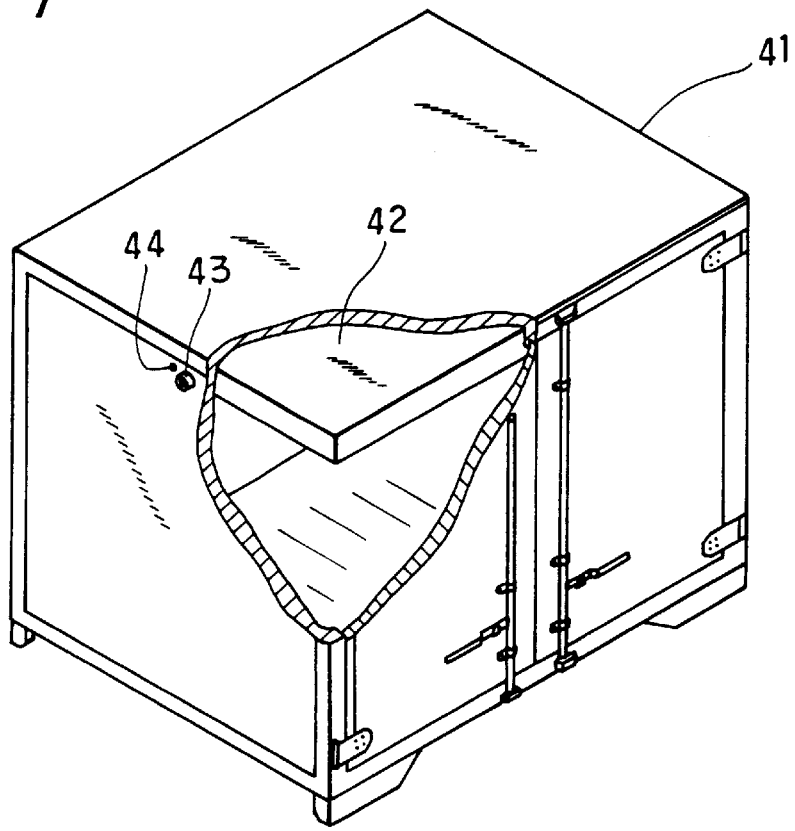
FIG. 7 is a perspective view of a medium-sized or a large-sized cold reserving container used in the system of the present invention shown in FIG. 1.

FIG. 7 shows a large-sized, heat-insulated and hard-side container 41, to which the system of the present invention is applied. In this case, a liquefied-gas supply chamber 42 is provided in an inner ceiling area of the hard-side container 41. Provided in an upper portion of an outer wall of the hard container 41 are: a connector 43 through which the liquefied-gas supply chamber 42 of the hard container 41 is connected with the nozzle 23 of the control box 22; and, a pressure-sensor receiving hole 44 for receiving the pressure sensor 31 of the control box 22 therein. Further, provided in the liquefied-gas supply chamber 42 of the hard container 41 is a compression means for compressing the carbon dioxide snow, i.e., snow dry ice.

Figure 8:
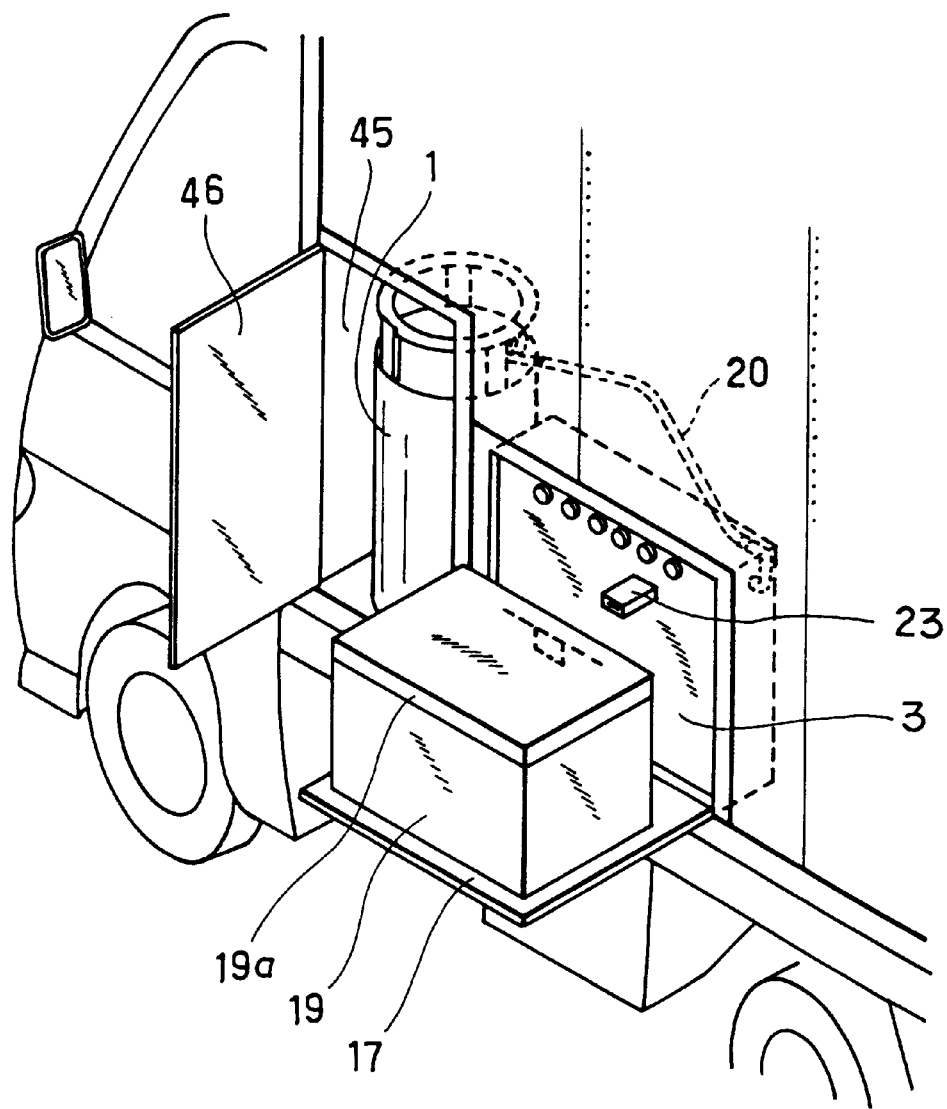
FIG. 8 is a perspective view of an installation example of another embodiment of the system of the present invention.

FIG. 8 shows the load-carrying platform of the light vehicle, to which the system of the present invention is applied. In this case, the cylinder holder 2 is not used. Conseqeuntly, the control box 3 has its container-carrying table 17 exposed to the outside, and fixedly mounted on a side wall of the load-carrying platform of the light vehicle, in which the container-carrying table 17 is capable of falling down outward.

A cylinder-mounting space 45 is provided in the load-carrying platform as to be adjacent to a mounting space of the control box 3. The liquefied-gas cylinder 1 is received in the cylinder-mounting space 45, in which the liquefied-gas cylinder 1 is replaced with a new one when exhaused. In FIG. 8, the reference numeral 46 denotes a door for the cylinder-mounting space 45.

Figure 10:
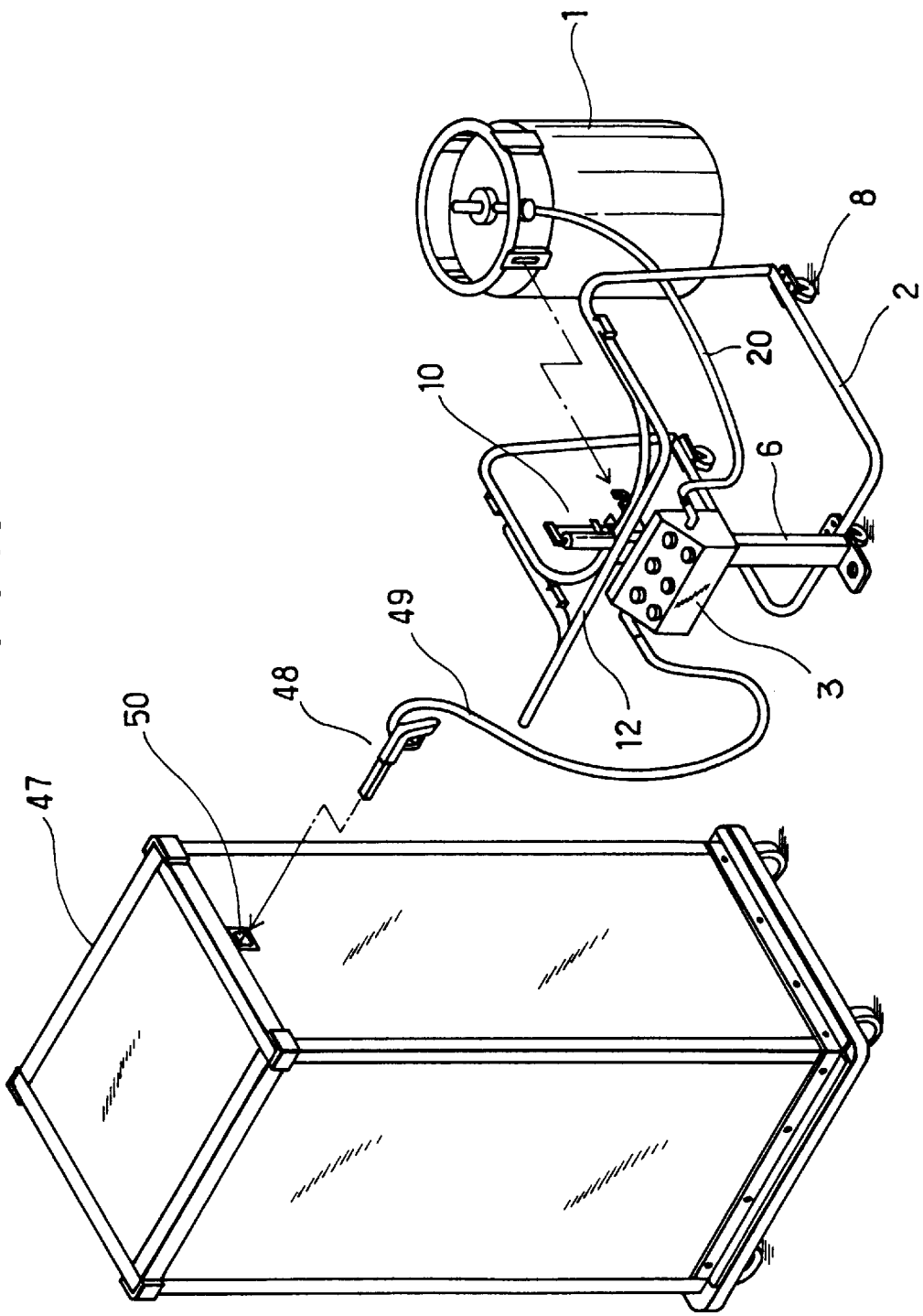
FIG. 10 is a perspective view of further another embodiment of the present invention, illustrating the construction and the usage thereof.

In an example shown in FIG. 10, a large-sized container 47 is used. In this case, the rapidly chilling system of the present invention is of a movable type, in which a gun-type nozzle 48 is mounted on a front-end portion of a flexible tube 49 extending from the control box 3. In use, the rapid chilling system of the present invention is moved toward the large-sized container 47. Then, the nozzle 48 of the rapid chilling system of the present invention is inserted into a nozzle-catching hole 50 of the large-sized container 48. After that, a trigger of the nozzle 48 is operated so that the liquefied gas is supplied to the large-sized container 47.

Figure 11:
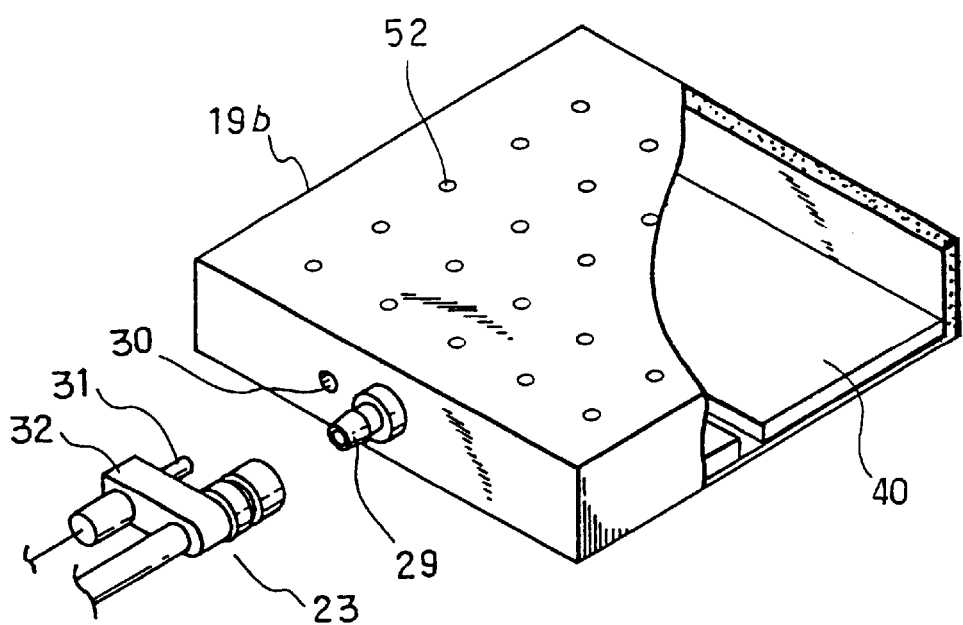
FIG. 11 is a perspective view of the cold reserving container used in further another embodiment of the present invention, illustrating the container in construction.

FIG. 11 shows an example of a boxlike lid 19b for the cold reserving container (not shown) when liquid nitrogen is used as the liquefied gas. This boxlike lid 19b has substantially the same construction as that of the xlike lid 19a shown in FIG. 4, with the exception of the following difference in construction therebetween. Namely, such difference in construction between these lids 19b and 19a is: that the boxlike lid 19b is provided with a plurality of vent holes 52 in its upper and/or side surfaces, which holes 52 are generally constructed of a plurality of small through-holes; and, that the boxlike lid 19b has no compression means. The remaining portions of the boxlike lids 19a, 19b are substantially the same in construction.

When the cold reserving member 40 is used in the system of the present invention in which liquid nitrogen is used as the liquefied gas, it is possible to adjust the cooling power of liquid nitrogen so as to be moderate in its effects upon the goods, though the cooling power of liquid nitrogen reaches a temperature of less than −100 degrees centigrade. Further, the cold reserving member 40 also functions to retard the cooling action of liquid nitrogen upon the goods, as is in the case of liquid carbon dioxide.

As for the system of the present invention, it is easy to load the system onto the vehicles and also easy to transfer it. Consequently, it is possible to use the system of the present invention in transportation and delivery of the chilled goods, and also in storage of foods and medicines when the emergency and disasters occur, and further in construction sites, on fishing boats, in campsites, and, in like situations.

Now, a cold reserving bag of the present invention will be described.

Figure 12A:
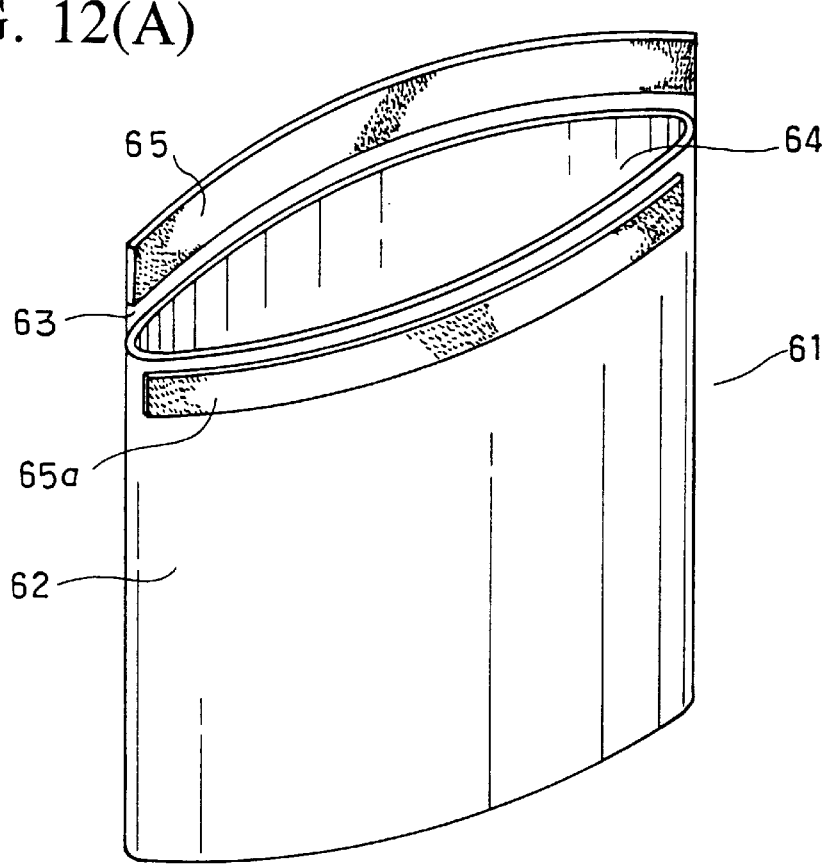
FIGS. 12(A) and 12(B) are perspective views of a first embodiment of the cold reserving bag of the present invention, illustrating the construction and the usage thereof.
Figure 12B:
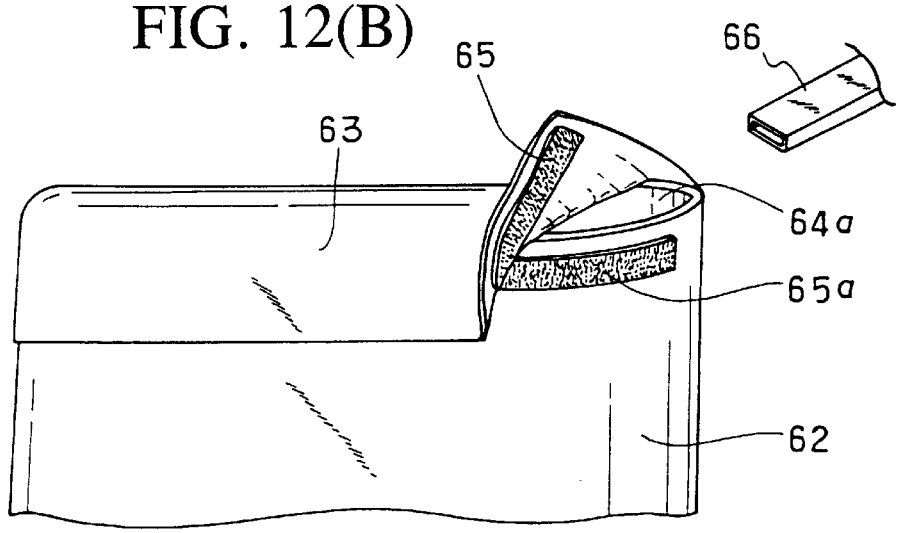

FIGS. 12(A) and 12(B) show an embodiment of the cold reserving bag of the present invention, which embodiment is simplest in construction, and provided with a bag body 62 preferably made of heat-insulating material. Formed in an upper-end portion of the bag body 62 are: an opening portion 64; and, a lapel portion 63 for covering the opening portion 64. Suitable fastening means 65 and 65a are fixedly mounted on an upper-end portion of a rear inner surface and an upper-end portion of a front outer surface of of the bag body 62, respectively. The fastening means 65, 65a may be constructed of repetitive-use fasteners, for example such as: hook-and-loop fasteners such as velcro tapes and the like; adhesive layers; and, like fasteners.

In use, the lapel portion 63 of the cold reserving bag 61 is pulled up to open the opening portion 64 of the bag 61, so that the goods are inserted into the bag 61. After completion of insertion of the goods into the bag 61, the lapel portion 63 is pulled down so as to have the fastening means 65, 65a firmly engaged with each other, whereby the opening portion 64 of the bag 61 is closed with the exception of a side-end portion of the opening portion 64, which side-end portion forms a nozzle-insertion hole 64a. Then, the nozzle 66 is inserted into the nozzle-insertion hole 64a of the bag 61. Under such circumstances, the power switch (not shown) of the rapid chilling system of the present invention is turned on. In this case, the power switch may be turned on when the user pushes his ten-yen coin into a coin slot of the system of the present invention. When the power switch is turned on, a preset amount of the liquefied gas is ejected from the nozzle 23 of the system through the electromagnetic valve (not shown) of the system.

Figure 18:
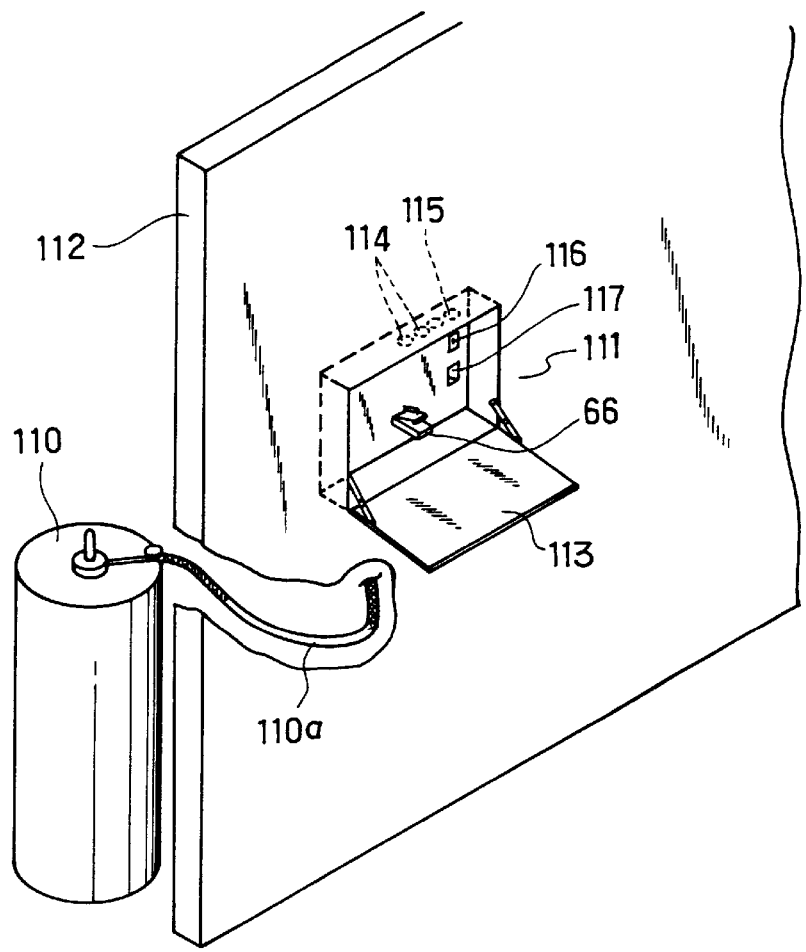
FIG. 18 is a perspective of another embodiment of the rapid chilling system of the present invention.

FIGS. 18 to 21 show additional embodiments of the rapid chilling system of the present invention installed in department stores, supermarkets and the like. In the drawings: the reference numeral 110 denotes a liquefied-gas cylinder; and, 111 a control box mounted in a wall 112 and connected with the liquefied-gas cylinder 110 through a flexible hose 110a. The control box 111 is provided with a working table 113, which also serves as a lid 113. In use, the lid 113 is pulled forward, and assumes its horizontal position. Under such circumstances, the user is capable of performing injection of the liquefied gas into the cold reserving bag 61. The nozzle 66 shown in FIG. 18 is fixedly mounted on the control box 111. On the other hand, the nozzle 66 shown in FIG. 20 may be pulled out of the control box 111.

A plurality of selecting switches 114 are provided in the control box 111. These selecting switches 114 are constructed of, for example such as: a button for selecting one-hour cold reservation; a button for selecting two-hour cold reservation; and, a button for selecting three-hour cold reservation. In operation, when the user selects and depresses a desired button, an appropriate amount of the liquefied gas is ejected from the nozzle 66, which amount corresponds to the period of time selected by the action of the electromagnetic valve (not shown). Incidentally, in the drawings: the reference numeral 115 denotes a pilot lamp; 116 a coin inlet slot; and, 117 a coin return opening.

Figure 19:
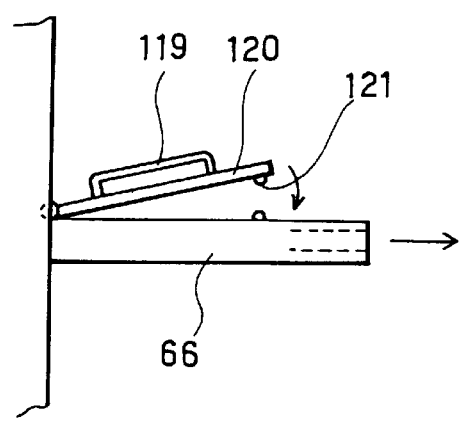
FIG. 19 is a side view of the nozzle used in the rapid chilling system of the present invention shown in FIG. 18, illustrating the construction of the nozzle.

FIG. 19 shows another example of the nozzle 66, in which a handle 119 is mounted on an upper surface of the nozzle 66. Further, a bag clip 120 provided with sensors (not shown) is swingably mounted on the upper surface of the nozzle 66. In use, the bag clip 120 is pulled up by means of the handle 119. Then, the nozzle-insertion hole 64a of the bag 61 has its end portion sandwiched between an upper surface of the nozzle 66 and the bag clip 120, so that the nozzle 66 is inserted into the nozzle-insertion hole 64a of the bag 61. After that, the bag clip 120 is released, and brought into press-contact with the end portion of the nozzle-insertion hole 64a of the bag 61. This condition is detected by means of a sensor mounted in the bag clip 120, so that the rapid chilling system of the present invention is ready for operating. In FIG. 19, the reference numeral 121 denotes a rubber packing. In the system of the present invention having the above construction, the bag clip 120 is not necessarily required. In other words, the bag clip 120 may be replaced with any other simple fastening means, for example such as those 65, 65a of the cold reserving bag 61 shown in FIGS. 12(A), 12(B).

Figure 20:
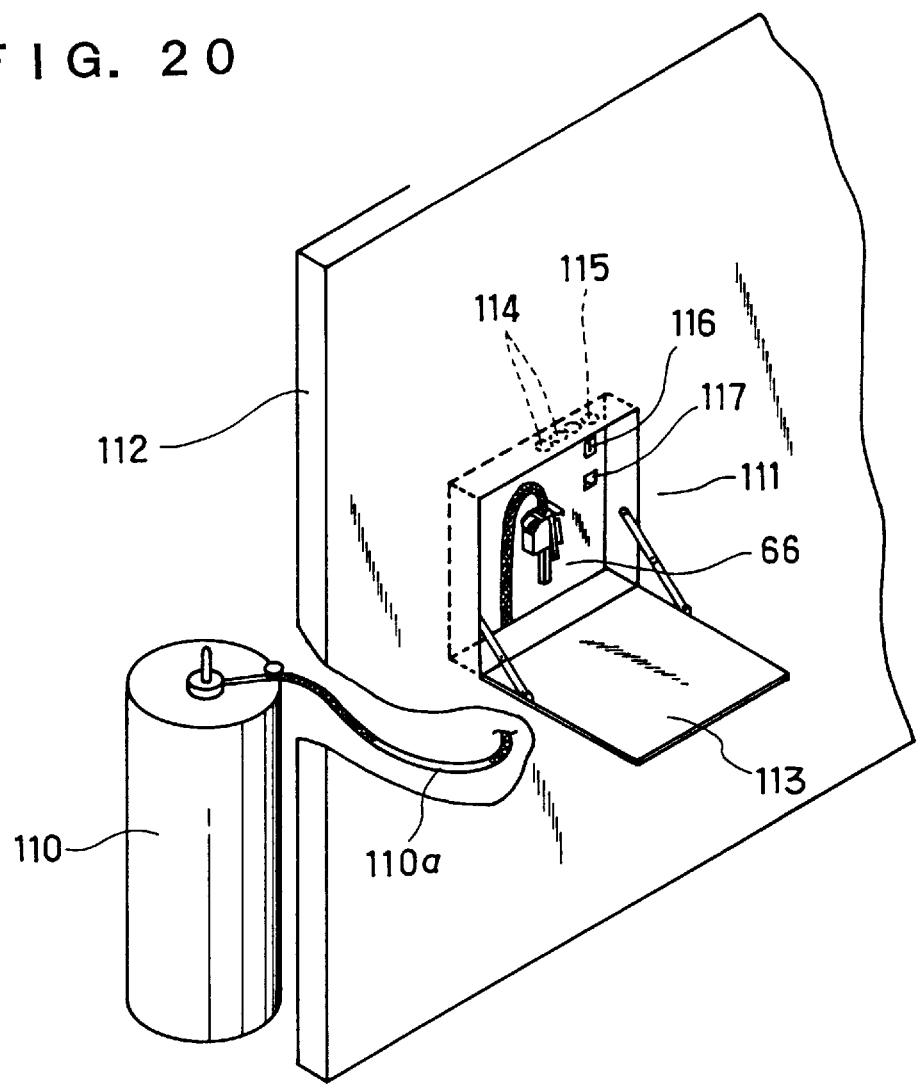
FIG. 20 is a perspective of further another embodiment of the rapid chilling system of the present invention.
Figure 21:
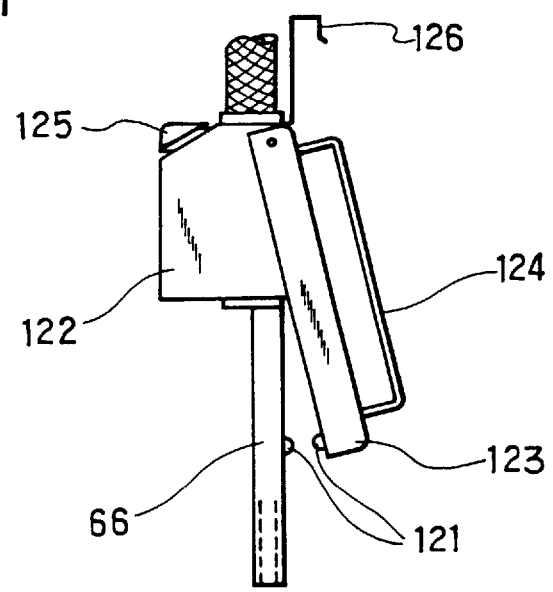
FIG. 21 is a side view of the nozzle used in the rapid chilling system of the present invention shown in FIG. 20, illustrating the construction of the nozzle.

FIG. 21 shows the details of the nozzle 66 shown in FIG. 20. The nozzle 66 is of a pullout type. In FIG. 21, the reference numeral 122 denotes a grip portion, to which the bag clip 123 is rotatably mounted. The bag clip 123 is provided with a finger-insertion portion 124. In use, the user has: his four fingers except his thumb inserted into the finger-insertion portion 124; his palm be in abutting engagement with the grip portion 122; and, his thumb placed on an injection switch 125, which is provided in the grip portion 122. After the bag clip 123 is closed substantially in the same manner as that described in the above as to the bag clip 120, the injection switch 125 is depressed so that the liquefied gas is injected into the cold reserving bag 61. Also in this case, the bag clip 123 is not necessarily required for the system of the present invention, as is in the above case. Incidentally, in FIG. 12, the reference numeral 126 denotes a hook for catching the grip portion 122 on the panel surface of the control box 111.

After the liquefied gas is supplied to the bag body 62 of the cold reserving bag 61, the nozzle-insertion hole 64a of the bag 61 is closed so that the opening portion 64 of the bag 61 is closed. At this time, in order to vent the gas produced inside the bag 61, the opening portion 64 of the bag 61 is not hermetically sealed. This is true in the following cases.

In general, liquid carbon dioxide used in the present invention is filled in the liquefied-gas cylinder 1 at a pressure of 20 KgF/cm2 G, provided that the cylinder 1 is heat-insulated by means of vaccum. When the liquid carbon dioxide is ejected from the liquefied-gas cylinder 1 at room temperatures, such ejection immediately increases the volume of carbon dioxide by a factor of 280. Of the carbon dioxide thus increased in volume, an approximately 47 percent by volume thereof forms carbon dioxide snow (i.e., snow dry ice), and the remaining approximately 53 percent by volume thereof forms carbon dioxide gas.

The liquefied gas thus supplied to the bag body 62 pushes the air confined in the bag 61 out of the bag 61, so that the atmosphere thus formed inside the bag 61 changes in chemical composition to produce various favorable effects (hereinafter referred to as the "gas-packed effects"). These favorable effects have already been applied to preventing oxidization of fabricated foods and the like. Due to such gas-packed effects, aerobia are prevented from propagating in meat and fishes, so that the meat and fishes are prevented from changing in quality and in color. Further, due to such gas-packed effects, vegetables and fruits are also prevented from ripening so as to be kept fresh for a long period of time in storage. The same gas-packed effects will be further described in the following cases.

Incidentally, the chilled goods to be reserved are not bare of packages. In other words, they are properly packaged or wrapped in proper sheets. Consequently, there is no fear that the chilled goods are brought into contact with dry ice and impaired in quality. Further, even when the chilled goods are bare of packages, and, therefore directly subjected to snow dry ice falling thereon, these goods are almost not impaired in quality. Therefore, it is possible to reserve the chilled goods at low temperatures for several hours, depending on: the heat-insulation performance of material, of which the bag body 62 is made; and, types of the goods to be stored.

Figure 13B:
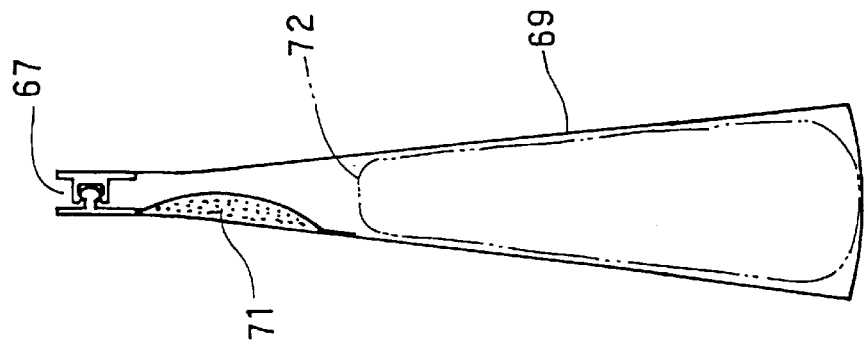
FIGS. 13(A) and 13(B) are a perspective and a side view of a second embodiment of the cold reserving bag of the present invention, illustrating the construction and the usage thereof, respectively.
Figure 13A:
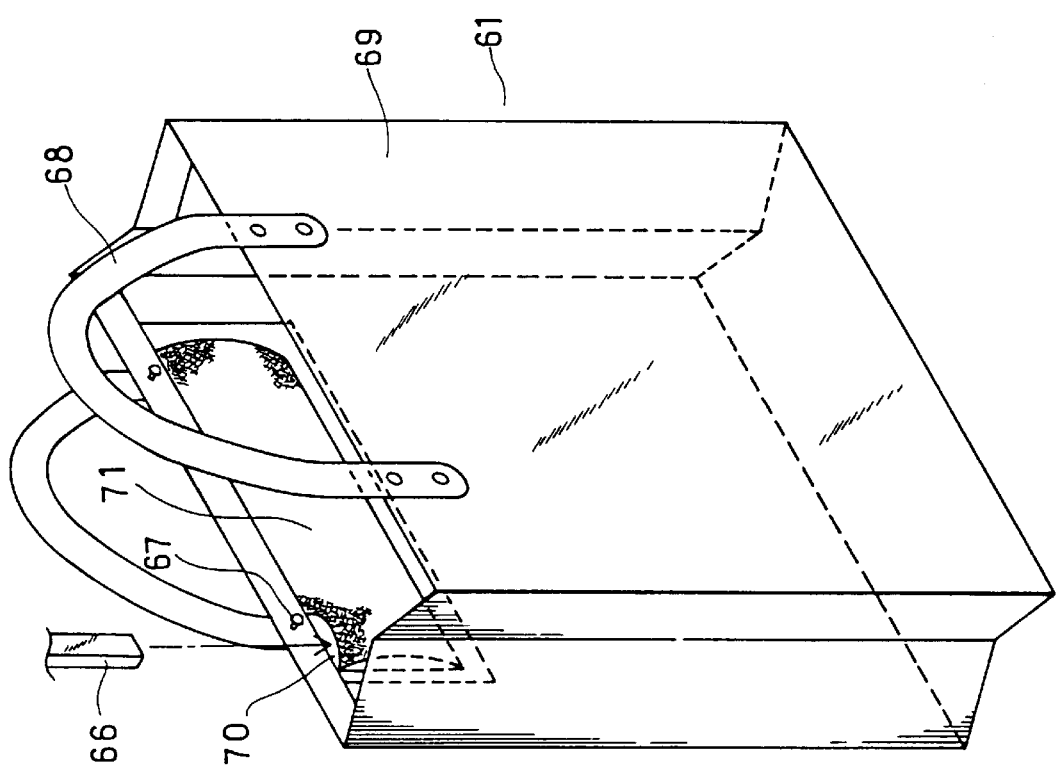

On the other hand, the cold reserving bag 61 shown in FIGS. 13(A), 13(B) is of the ordinary paper-bag type, and, therefore provided with an opening-closure means 67 of the ordinary type and a pair of handles 68. As is clear from FIG. 13(A), a snow-receiving bag 71 is mounted on at least one of inner side surfaces of the back body 69 of the cold reserving bag 61, and provided with a nozzle-insertion hole 70 in an upper portion of the above one of the side surfaces. The snow-receiving bag 71 is made of gas-permeable materials such as meshes and the like. Although the bag body 69 of the cold reserving bag 61 is preferably constructed of heat-insulation members, it is also possible to have the bag body 69 constructed of the ordinary paper.

In use, as is in the above cases, the nozzle 66 is inserted into the nozzle-insertion hole 70 of the snow-receiving bag 71 in the cold reserving bag 61. Then, the liquefied gas is injected into the now-receiving bag 71 to produce snow dry ice therein. The opening portion of the cold reserving bag 61 is closed by means of the opening-closure means 67, which enables the cold reserving bag 61 to keep the goods 72 cool for several hours, provided that the goods are in the bag body 69 of the bag 61.

Figure 14B:
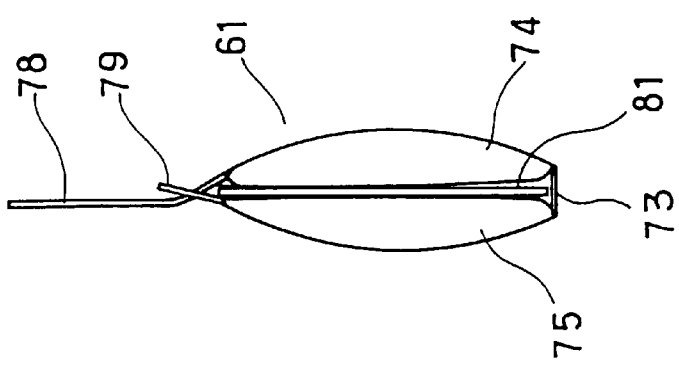
FIGS. 14(A) and 14(B) are a perspective and a side view of a third embodiment of the cold reserving bag of the present invention, illustrating the construction and the usage thereof, respectively.
Figure 14A:
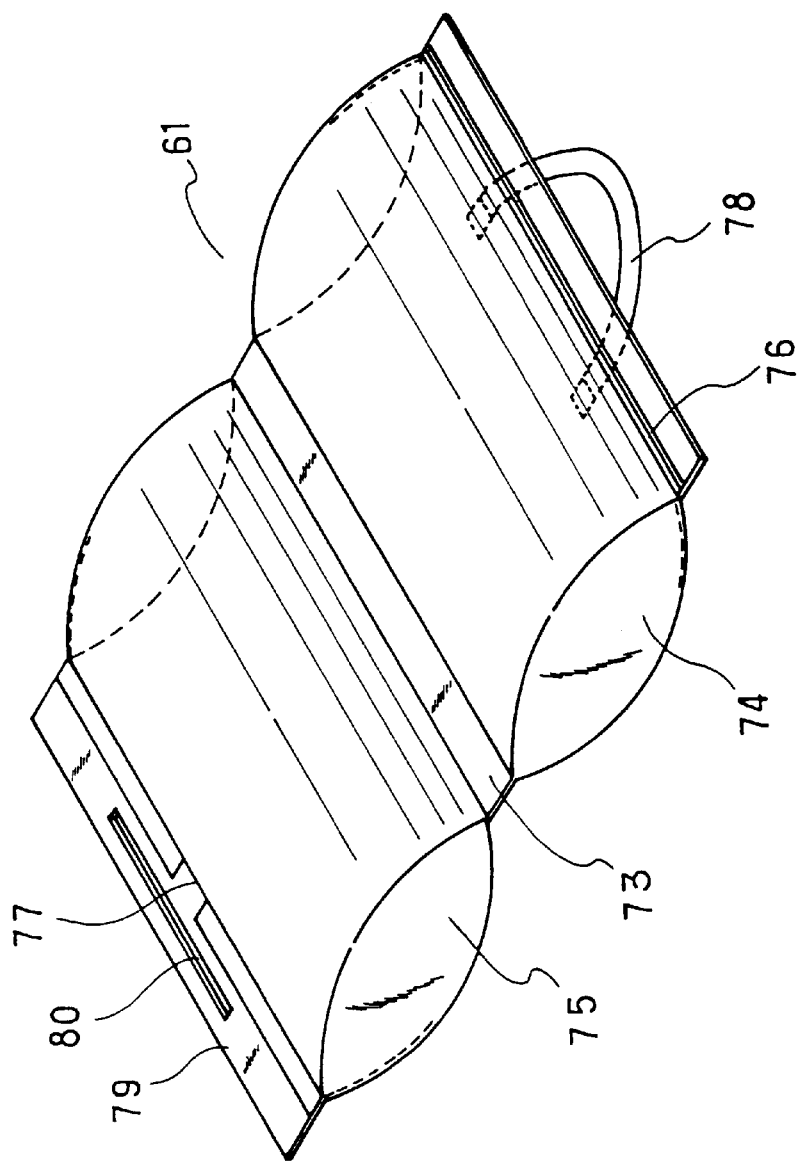

On the other hand, the cold reserving bag 61 shown in FIGS. 14(A) and 14(B) is provided with a pair of storage portions 74, 75. These portions 74, 75 are substantially symmetrically arranged, and connected with each other through a connecting portion 73 disposed therebetween. Of these portions 74, 75, one 74 forms a storage portion for storing the goods therein, and the other 75 forms a cooling portion for receiving therein the liquefied gas having been ejected. The storage portion 74 is provided with an opening/closing means 76 in its end portion. The opening/closing means 76 is constructed of a zipper and like fasteners. On the other hand, the cooling portion 75 is provided with a nozzle-insertion hole 77 in a proper position or center of its end portion. Further, an appropriate handle means is provided in each of the storage portion 74 and the cooling portion 75. In the example shown in the drawings, the handle means provided in the storage portion 76 is constructed of a handle 78. As for the cooling portion 75, a slit 80 is provided in an end portion of the cooling portion 75 to receive the handle 78 of the storage portion 74 therein, as shown in FIG. 14(B).

In use, after the goods are stored in the storage portion 74, the nozzle 66 is inserted into the nozzle-insertion hole 77. Then, the liquefied gas is injected into the cooling portion 75 through the nozzle-insertion hole 77 to produce snow dry ice in the cooling portion 75, as is in the above case. After that, the handle 78 is inserted into the slit 80, so that the storage portion 74 is brought into area-contact with the cooling portion 75, as is clear from FIG. 14(B). Incidentally, in order to prevent the goods from being subcooled, preferably, a piece of paper 81 is sandwiched between the storage portion 74 and the cooling portion 75. When the piece of paper 81 is large in thickness, and, therefore sufficiently rigid, the piece of paper 81 is capable of preventing the bag 61 from losing shape.

Figure 15B:
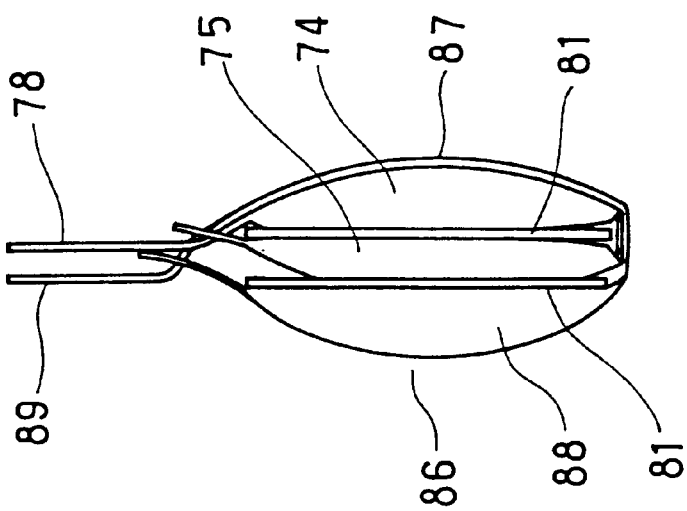
FIGS. 15(A) and 15(B) are a perspective and a side view of a fourth embodiment of the cold reserving bag of the present invention, illustrating the construction and the usage thereof, respectively.
Figure 15A:
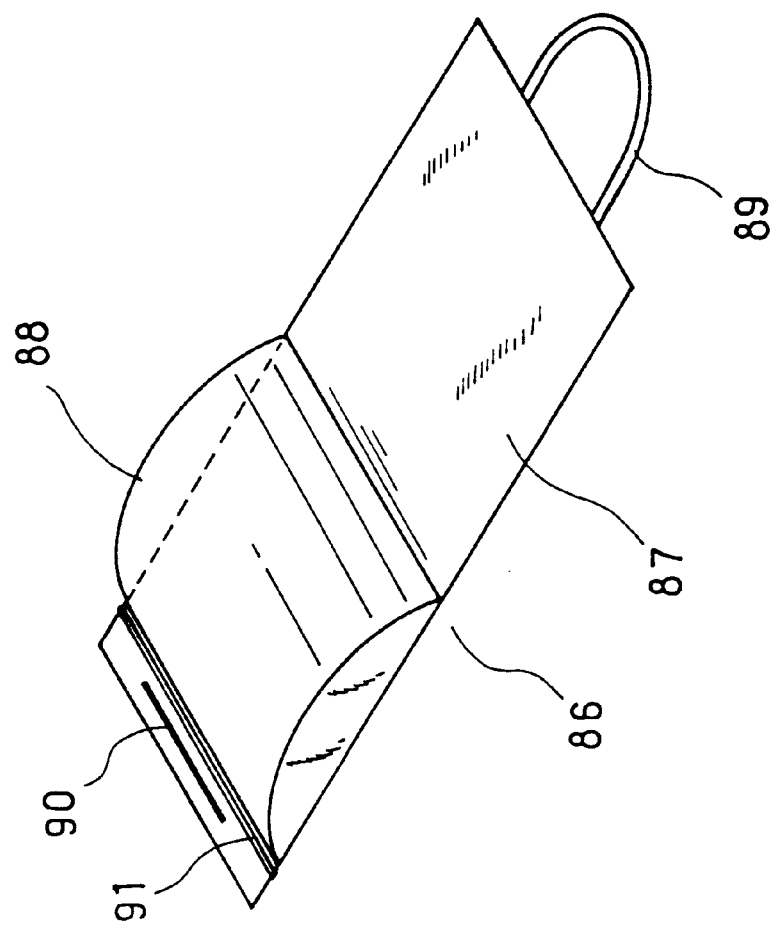

FIGS. 15(A) and 15(B) show an attachment 86, which is used together with the cold reseving bag 61 of FIGS. 14(A) and 14(B). The attachment 86 is provided with a storage portion 88 for storing the goods therein. The storage portion 88 is provided in a half area of a sheet 87. A handle 89 is provided in one of opposite end portions of the sheet 87. Formed in the other of the opposite end portions of the sheet 87 is a slit 90 for receiving the handle 89 therein. In general, as is in the above case, an appropriate opening/closing means 91 is provided in the storage portion 88.

In the attachment 86, after the goods are stored in the storage portion 88 thereof, the storage portion 88 is brought into area-contact with the cooling portion 75 of the cold reserving bag 61. After that, the handle 89 is inserted into both the slit 80 of the cold reserving bag 61 and the slit 90 of the attachment in a manner such that the storage portion 74 is wrapped in the sheet 87.

Further, FIGS. 16(A) and 16(B) show the cold reserving bag 61, which is a modification of the example shown in FIGS. 14(A) and 14(B). In this modification, the storage portion 74 for storing the goods therein is used, which portion 74 is the same in construction as that used in the example of FIGS. 14(A), 14(B). The difference in construction between the example and the modification is that the cooling portion 75 used in the example is replaced with a compound bag 82 of the modification. The compound bag 82 is provided with a pair of spaces 82a, 82b, one 82b of which is for receiving the goods therein, and the other 82a for receiving therein the liquefied gas having been ejected. These two spaces 82a, 82b are separated from each other through a partition 83. In use, when the cold reserving bag 61 of the modification is folded in half, the space 82a for receiving the liquefied gas appears inside the thus folded bag 61. Incidentally, the space 82a is provided in the upper side of the bag 61, as viewed in FIG. 16(A). The compound bag 82 is provided with an opening/closing means 84 for opening/closing the storage space 82b to load and unload the goods.

Figure 17:
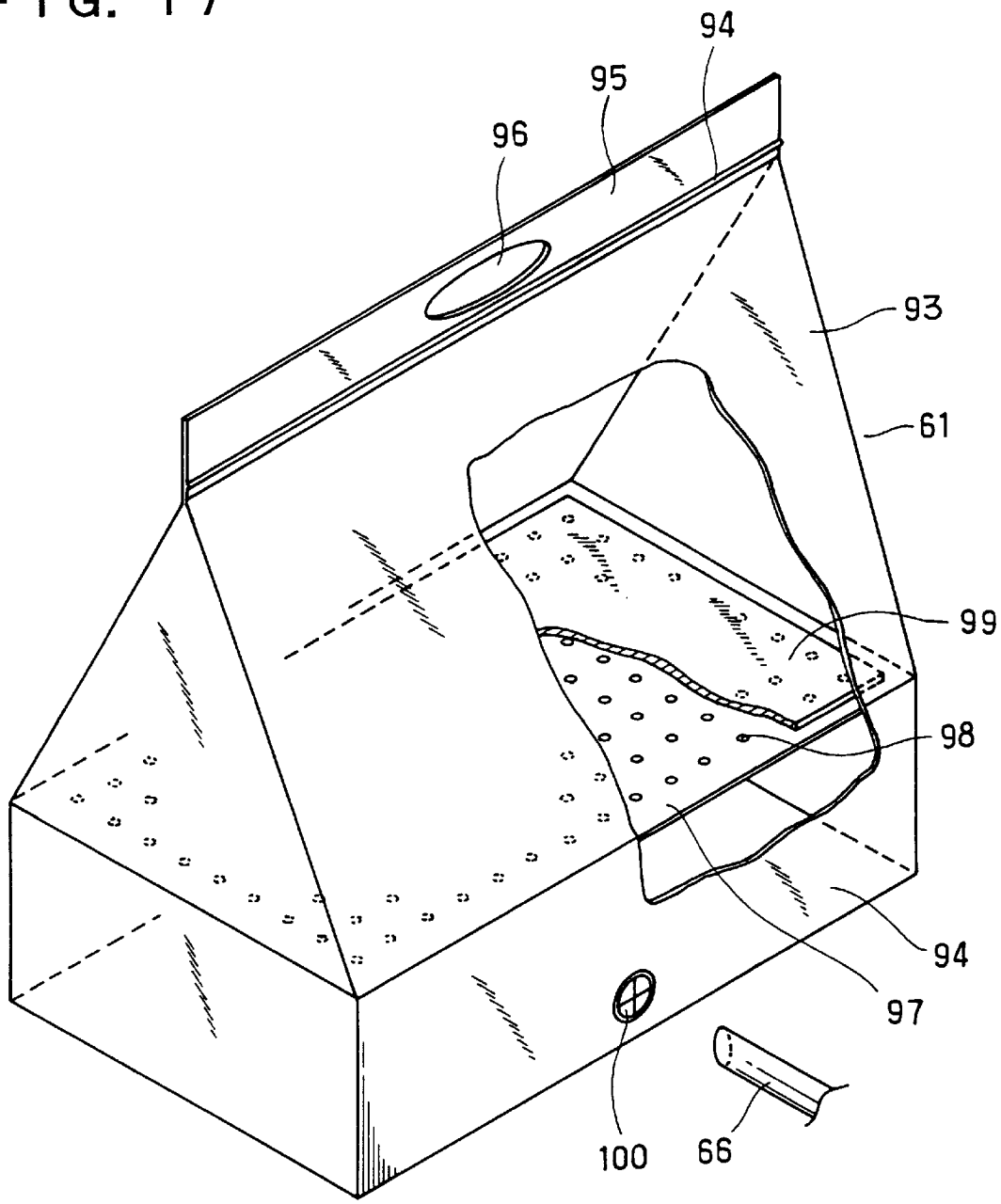
FIG. 17 is a perspective of a sixth embodiment of the cold reserving bag of the present invention, illustrating the construction and the usage thereof.

In general, any of the examples and modification of the cold reserving bag 61 described above is of a repetitive-use type. On the other hand, an example of the bag 61 shown in FIG. 17 is of a throwaway type, in which the cold reserving bag 61 is provided with a pair of vertically stacked spaces, an upper one of which forms a storage space 93 for storing therein the goods, and the remaining or lower one of which forms a liquefied-gas injection space 94. The storage space 93 is provided with an opening/closing means 94 in its upper end portion, and also provided with an elongated opening 96 in a center of its end projection portion 95. The opening 96 forms a handle of the bag 61.

On the other hand, the storage space 93 is provided with a bottom portion 97, which partitions the interior of the cold reserving bag 61 into the storage space 93 and the liquefied-gas injection space 94. In general, a plurality of through-holes 98 are formed in the bottom portion 97 of the storage space 93. If necessary, in order to prevent the goods from being subcooled and also to prevent the bag 61 from losing shape, an appropriate piece of paper 99 is disposed on the bottom portion 97.

The liquefied-gas injection space 94 is provided with a nozzle-insertion hole 100 in one of its side surfaces. In this connection, it is possible to form the nozzle-insertion hole 100 in such side surface, for example, by making a cross-shaped cut therein. It is necessary for such side surface to remain hermetical to a certain extent even after the nozzle 66 is pulled out of the nozzle-insertion hole 100.

In the cold reserving bag of the present invention, the liquefied gas is supplied into a container containing the goods, which a mere consumer purchased, so that carbon dioxide snow is produced in the container, whereby the interior of the container is cooled.

Consequently, the cold reserving bag of the present invention makes easier for the consumer to keep at low temperatures the chilled goods such as frozen goods, perishable foods, ice creams and the like purchased from department stores, supermarkets and like stores, when he takes the goods home.

Namely, the cold reserving bag of the present invention may release the consumer from the constraint that he must get home without making any side trip upon purchase of the chilled goods in his shopping. Consequently, the consumer carrying the cold reserving bag of the present invention may sufficiently enjoy his shopping. The cold reserving bag of the present invention is capable of keeping the goods fresh. Further, due to its gas-packed effects already described above, the cold reserving bag of the present invention is capable of providing the sanitary merit of preventing the chilled goods from changing in quality.

What is claimed is:

1. A compact rapid chilling system comprising:
   a liquefied gas cylinder fillable with a liquefied gas;
   a cylinder holder for holding said liquefied-gas cylinder; and
   a control box mounted on said cylinder holder, said control box including a nozzle for issuing a jet of said liquefied gas through an electromagnetic valve, said liquefied gas being supplied from said liquefied-gas cylinder, said control box further including a control switch for controlling said jets;
   said control box comprising a container-carrying table for carrying a container thereon, said container-carrying table being constructed of a side wall of said control box, which wall is capable of opening and remaining horizontal resultant from said opening.

2. The compact rapid chilling system as set forth in claim 1, wherein:
   said cylinder holder is movable, and is provided with a lifting means; and
   said lifting means is capable of lifting said liquefied-gas cylinder when said liquefied-gas cylinder held by said cylinder holder is moved.

3. The compact rapid chilling system as set forth in claim 1 wherein:
   said nozzle is so separated from said control box as to be controllable.

4. The compact rapid chilling system as set forth in claim 1, wherein:
   said liquefied gas used in said system is carbon dioxide gas;
   said system is combined with a cold reserving container; and
   said container is provided with a liquefied-gas supply space and a compression means in its upper portion, said liquefied-gas supply space receiving said liquefied gas supplied from said nozzle, said compression means compressing carbon dioxide snow which is produced by supplying said liquefied gas into said liquefied-gas supply space.

5. The compact rapid chilling system as set forth in claim 4, wherein:
   a cold reserving member is disposed in each of a bottom surface, side surfaces and an upper surface of said liquefied-gas supply space.

6. A compact rapid chilling system comprising:
   a liquefied-gas cylinder, filled with a liquefied gas and detachably mounted on a load-carrying platform of a vehicle;
   a control box provided with a nozzle for issuing a jet of said liquefied gas through an electromagnetic valve, said liquefied gas being supplied from said liquefied-gas cylinder;
   said control box having its control panel fixedly mounted on said load-carrying platform in a condition in which said control panel faces toward the outside of said control box, said control panel being provided with: said nozzle; and, a control switch for controlling said jet issued from said nozzle; and
   a cover member for covering said control panel, said cover member being so opened as to assume its horizontal opening position in which said cover member forms a container-carrying table.

7. The compact rapid chilling system as set forth in claim 6, wherein:
   said nozzle is so separated from said control box as to be controllable.

8. The compact rapid chilling system as set forth in claim 7, wherein:
   said liquefied gas used in said system is carbon dioxide gas;
   said system is combined with a cold reserving container; and
   said container is provided with a liquefied-gas supply space and a compression means in its upper portion, said liquefied-gas supply space receiving said liquefied gas supplied from said nozzle, said compression means compressing carbon dioxide snow which is produced by supplying said liquefied gas into said liquefied-gas supply space.

9. The compact rapid chilling system as set forth in claim 3, wherein:

liquid nitrogen is used as said liquefied gas;

said system is combined with a cold reserving container; and said cold reserving container is provided with: a liquid-nitrogen supply space in its upper portion, said liquid-nitrogen supply space receiving said liquid nitrogen supplied from said nozzle; and, a vent hole formed in an upper surface and/or a side surface of said liquid-nitrogen supply space.

10. The compact rapid chilling system as set forth in claim 3, wherein:

liquid nitrogen is used as said liquefied gas;

said system is combined with a cold reserving container; and said cold reserving container is provided with: a liquid-nitrogen supply space in its upper portion, said liquid-nitrogen supply space receiving said liquid nitrogen supplied from said nozzle; a cold reserving member disposed in a bottom surface and/or a side surface of said liquid-nitrogen supply space; and, a vent hole formed in an upper surface and/or said side surface of said liquid-nitrogen supply space.

11. The compact rapid chilling system as set forth in claim 6, wherein:

liquid nitrogen is used as said liquefied gas;

said system is combined with a cold reserving container; and said cold reserving container is provided with: a liquid-nitrogen supply space in its upper portion, said liquid-nitrogen supply space receiving said liquid nitrogen supplied from said nozzle; and, a vent hole formed in an upper surface and/or a side surface of said liquid-nitrogen supply space.

12. The compact rapid chilling system as set forth in claim 6, wherein:

liquid nitrogen is used as said liquefied gas;

said system is combined with a cold reserving container; and said cold reserving container is provided with: a liquid-nitrogen supply space in its upper portion, said liquid-nitrogen supply space receiving said liquid nitrogen supplied from said nozzle; a cold reserving member disposed in a bottom surface and/or a side surface of said liquid-nitrogen supply space; and, a vent hole formed in an upper surface and/or said side surface of said liquid-nitrogen supply space.

* * * * *